US005302194A

United States Patent [19]

Tanabe et al.

[11] Patent Number: 5,302,194

[45] Date of Patent: Apr. 12, 1994

[54] HEAT SENSITIVE COLOR DEVELOPING MATERIAL

[75] Inventors: Hisaki Tanabe, Yawata; Yasuhiko Nakae, Sakai; Shingi Nakano, Takatsuki; Yoshio Eguchi, Ikeda, all of Japan

[73] Assignee: Nippon Paint Co., Ltd., Osaka, Japan

[21] Appl. No.: 726,835

[22] Filed: Jul. 8, 1991

[30] Foreign Application Priority Data

Jul. 9, 1990 [JP] Japan .................................. 2-181877

[51] Int. Cl.$^{5}$ .............................................. C09D 11/02

[52] U.S. Cl. .................................. 106/21 A; 503/209; 503/216; 503/225; 427/148

[58] Field of Search ...................... 106/21, 14.5, 21 A; 427/148; 503/208, 209, 216, 225

[56] References Cited

U.S. PATENT DOCUMENTS 3,984,605 10/1976 Kohmura et al. .................... 427/148

FOREIGN PATENT DOCUMENTS 1-294088 11/1989 Japan ............................. B41M 5/18
2-171293 7/1990 Japan ............................. B41M 5/20

*Primary Examiner*—Christine Skane
*Assistant Examiner*—Margaret Einsmann
*Attorney, Agent, or Firm*—Thomas R. Morrison; Vineet Kohli

[57] ABSTRACT

A heat sensitive color developing material containing an electron donating color forming organic compound, a heat activating compound, and a color developer. These materials have excellent heat sensitivity in which color can be developed rapidly and can be produced and easily used.

9 Claims, No Drawings

HEAT SENSITIVE COLOR DEVELOPING MATERIAL

BACKGROUND OF THE INVENTION

The present invention relates to a heat sensitive color developing material which can be used as a recording material, and for other purposes.

A conventional heat sensitive color developing material is produced by dispersing an electron donating color forming organic compound and a phenolic compound as a color developer into a binder in high concentrations, and then coating it onto paper. As soon as the phenolic compound is fused by heating, a phenolic hydroxyl group allows the electron donating compound to develop color.

However, there are the following disadvantages in the conventional systems:

(1) In general, the phenolic compound is readily soluble in an organic solvent. When it is mixed with the electron donating organic compound, they both dissolve and color begins to form immediately prior to heating. Therefore, the materials do not have an opportunity to dissolve and mix uniformly with each other.

(2) It is difficult to disperse both materials, i.e., the electron donating organic compound and the phenolic compound into the binder in finely divided form (less than one micron) and uniformly.

(3) In order to maintain a suitable heat sensivity under a given temperature, it is adjusted by the melting point of the phenolic compound. Suitable phenolic compounds are limited so that it is difficult to achieve.

Japanese Patent Application Publication No. 62-263525 describes a heat sensitive color developing material using a compound or resin containing a neutral t-butyl ester as the electron donating compound, for example, a leuco compound. When the compound or resin containing the neutral t-butyl ester radical is heated at temperatures of 200° C. or higher, it decomposes rapidly into carboxylic acid and isobutane. Due to the presence of the carboxylic acid, the leuco begins to develop color. This results in an improvement in the conventional heat sensitive color developing material using the phenolic compound as a color developing agent.

Japanese Patent Application Publication No. 63-325637 provided improvements in the above discussed material and found a color developer resolvable at lower temperatures and obtained a heat sensitive color developing material color developable at a lower temperature.

OBJECTS AND SUMMARY OF THE INVENTION

Accordingly, it is an object of the invention to provide a heat sensitive color developing material having an excellent heat sensivity, in which color can be developed rapidly and which can be easily produced and easily used.

It is a further object of the invention to provide a heat sensitive color developing material having an excellent heat sensivity in which color can be developed rapidly when it is heated at a relatively low temperature.

It is a still further object of the invention to provide color development of the electron donating color organic compound even when the organic compound is mixed therewith.

Briefly stated, the present invention provides a heat sensitive color developing material having unexpected heat sensitivity, from which color can be developed rapidly and which can be easily produced and easily used.

According to an embodiment of the invention, there is provided a heat sensitive color material comprising:

(A) an electron donating color forming organic compound;

(B) a heat activating compound selected from the group consisting of compounds I, II, and III:

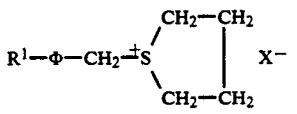

[I]

wherein $R^1$ is selected from the group consisting of H, —R, —OR, a halogen atom, and a nitro group, X is selected from the group consisting of $F_6$, $SbF_6$, $BF_4$, $BF_6$, $PF_6$, $ClO_4$, $FeCl_4$, $CF_3SO_3$, $RSO_3$ and RCOO—, wherein R is selected from the group consisting of alkyl and cycloalkyl of 1 to 12 carbon atoms substituted by —OH,

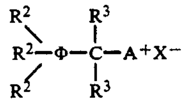

[II]

wherein $R^2$ is independently selected from the group consisting of $R^1$, —COR, —OH, a cyano radical, an amino radical, $R^3$ is selected from the group consisting of H, —R and a halogen atom, A is selected from the group consisting of

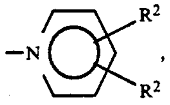

, and

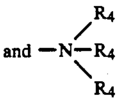

wherein $R^4$ is selected from the group consisting of an alkyl and alkenyl of 1 to 12 carbon atoms substituted by a group selected from the group consisting of hydroxy, carboxy, nitro, alkoxy and alkanoyloxy of 1 to 4 carbon atoms, a phenyl group substituted by at least one of a halogen atom, nitro, cyano, amino, $—NR_2$, —R, and —OR, wherein R, $R^1$, and X are as defined above;

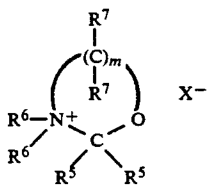

[III]

wherein $R^5$ is selected from the group consisting of H, —R, alkenyl of 2 to 3 carbon atoms and $R^8$, $R^6$ is selected from the group consisting of —R, alkenyl of 2 to 3 carbon atoms and $R^8$, $R^7$ is selected from the group consisting of H, hydroxy, —R, —OR, and $—R^8$, wherein $—R^8$ is selected from the group consisting of phenyl, phenyl substituted by a halogen atom, hydroxy, nitro, cyano, —NHR, —R and —OR, m is an integer of 1 to 4 and R and X are as defined above, and (C) a color developer is selected from the group consisting of compounds IV, V, and a resin

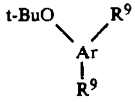

[IV]

wherein Ar is selected from the group consisting of benzene and naphthalene which may be substituted by one of a t-butyl oxide and a $R^9$, and $R^9$ is selected from the group consisting of H, —R, —OR, —OCOR, a halogen atom and nitro group, and R is as defined above;

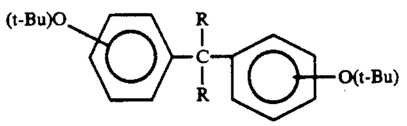

[V]

wherein R is as defined as above, and a resin compound of average molecular weight of about 500 to 50,000 containing a chain of a t-butoxyphenyl group.

The electron donating color developing organic compound (A) is a colorless or light color compound. When the electron is removed by, for example, oxidation, it is changed into a dark color compound, which may be a leuco dye which is normally used for the heat sensitive recording material. Typically, the leuco dye is selected from one or more of the following groups: triphenyl methane phthalide, fluoran, phenothazine, indolyl phthalide, leucoauramine, rhodamine lactone, indoline, triphenyl methane, araphthalimide, chromenoindole or triazine. Preferably, these compounds are selected from crystal violet lactone, 3,3-bis(p-dimethylaminophenyl)-6-dimethylaminophthalide, 3,3-bis(p-dimethylaminophenyl) phthalide, 3-(p-dimethylaminophenyl)-3-(1,2-methylindole-3-ile) phthalide, 3-(p-dimethylaminophenyl)-3-(2-methylindole-3-il) phthalide, 3-(p-diethylaminophenyl)-3-(1-ethyl-2-methylindole-3-il) phthalide, 3-(p-dimethylaminophenyl)-3-(2-phenylindole-3-ile) phthalide, 3,3-bis-(1,2-dimethylindole-3-ile)-5-dimethylaminophthalide, 3,3-bis-(1,2-dimethylindole-3-ile)-6-dimethylphthalide, 3,3-bis-(1-n-butyl-2-methylindole-3-ile) phthalide, 3,3-bis-(9-ethylcarbazole-3-ile)-5-dimethylaminophthalide, 3,3-bis-(2-phenylindole-3-ile)-5-dimethylaminophthalide, 3-p-dimethylaminophenyl-3-(1-methylpyrole-2-ile)-6-dimethylaminophthalide, 4-4[1]-bis-dimethylaminobenzylhydolinebenzylethyl, N-halophenylleucoauramine, N-2,4,5,-trichlorophenylleucoauramine, rhodamine-(p-nitroanilino) lactam, 3-dimethylamino-6-methoxyfluoran, 3-diethylamino--7-methoxyfluoran, 3-diethylamino-7-chloro-6-methylfluoran, 3-diethylamino-7-(acetylmethylamino) fluoran, 3-diethylamino-7-(dibenzylamino) fluoran, 3-diethylamino-7-(chloroethylmethylamino) fluoran, 3-dibutylamino-6-methyl-7-anilino fluoran, benzoylleucomethylene blue-3,7-bis(dimethylamino)-10-benzoylphenotriazine, p-nitrobenzylleucomethylene blue, 3-methyl-spiro-dinaphthopyrane, 3-ethyl-spiro-dinaphthopyrane, 3,3[1]-dichloro-spirodinaphthopyrane, 3-benzyl-spiro-dinaphthopyrane,3-methyl-naphtho-(3-methoxybenzo)spiropyrane, and the like.

By heating the heat activating compound (B) according to this invention, the color developer is produced. The heat activator has been described according to the formulae I to III depicted supra. The aromatic sulfonium organic acid salts of formula I may be depicted as follows:

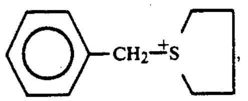

$PF_6^-$

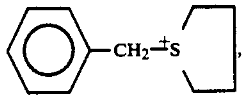

$AsF_6^-$

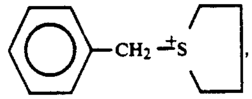

$SbF_6^-$

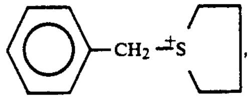

$BF_6^-$

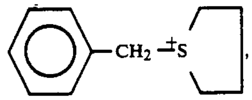

$CF_6SO_6^-$

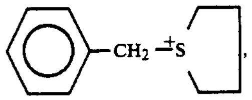

$ClO_4^-$

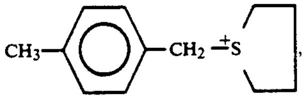

$PF_6^-$

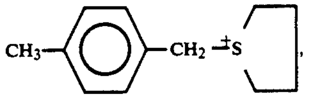

$AsF_6^-$

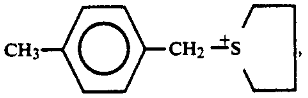

$SbF_6^-$

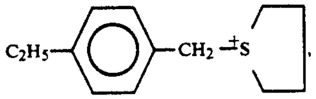

$PF_6^-$

-continued

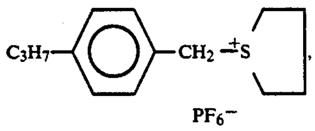
,

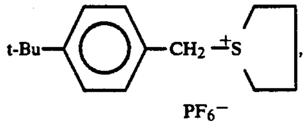
,

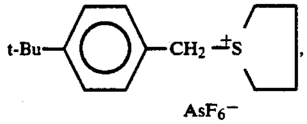
,

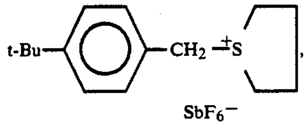
,

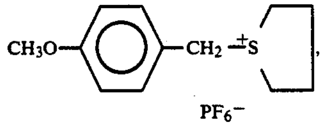
,

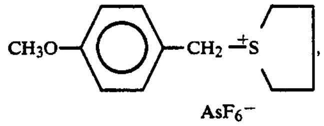
,

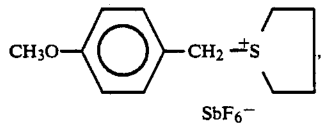
,

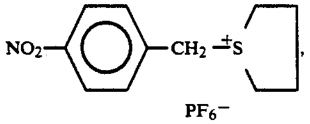
,

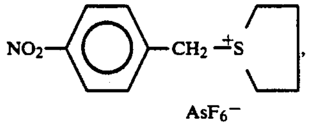
,

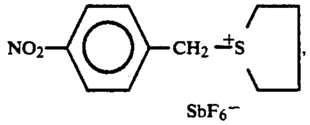
,

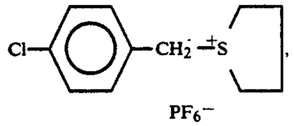
,

-continued

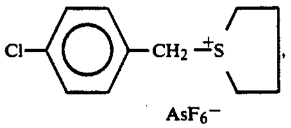
,

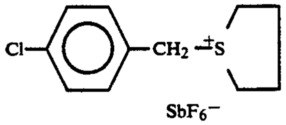

These aromatic sulfonium organic acid salts can be easily produced by reacting, e.g., thiopene with the corresponding benzyl halide, and then carrying out a salt exchange.

The aromatic ammonium organic acid salts of formula II may be depicted as follows:

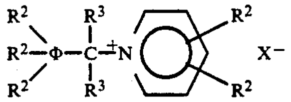
[II-1]

wherein $R^2$, $R^3$ and X are as defined above, and

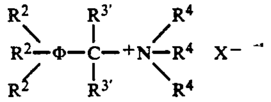
[II-2]

wherein $R^{3'}$ is H, —R, or a halogen atom, $R^2$, $R^4$, and X are as defined above.

Additional ammonium compounds are depicted by the following formulae:

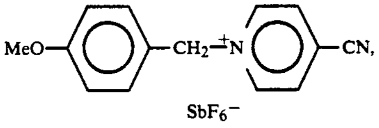
,

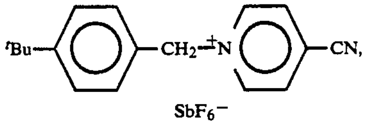
,

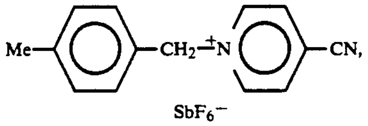
,

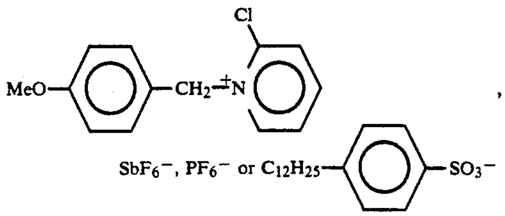
,

-continued
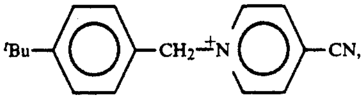,
$BF_4^-$
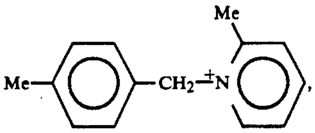,
$SbF_6^-$
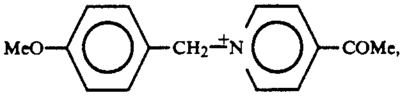,
$SbF_6^-$
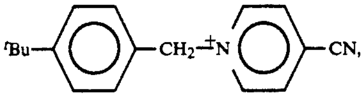,
$PF_6^-$
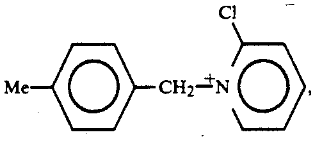,
$SbF_6^-$
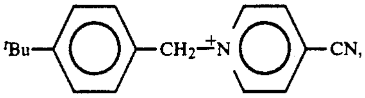,
$BF_4^-$
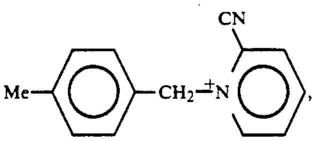,
$SbF_6^-$
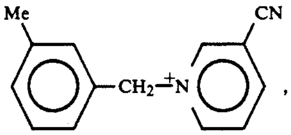,
$SbF_6^-$
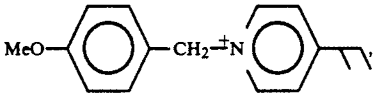,
$SbF_6^-$
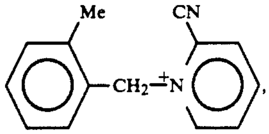,
$SbF_6^-$
-continued
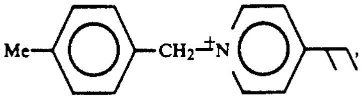,
$SbF_6^-$
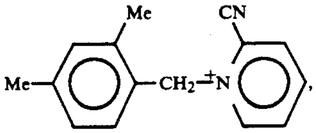,
$SbF_6^-$
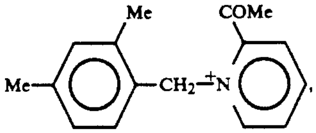,
$SbF_6^-$
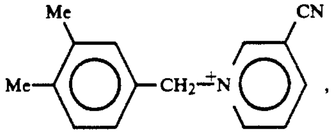,
$SbF_6^-$
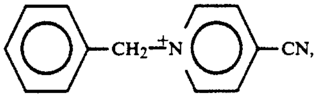,
$SbF_6^-$
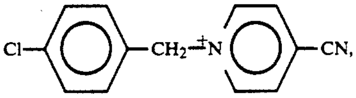,
$SbF_6^-$
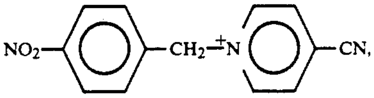,
$SbF_6^-$
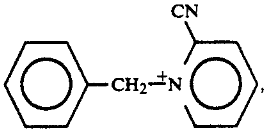,
$SbF_6^-$
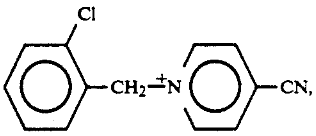,
$SbF_6^-$
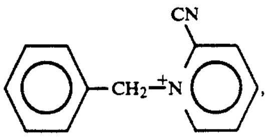,
$PF_6^-$ -continued
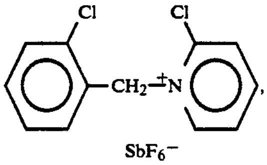
,
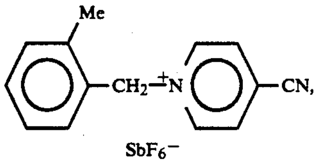
,
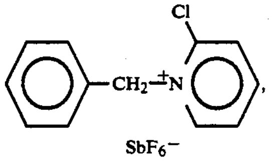
,
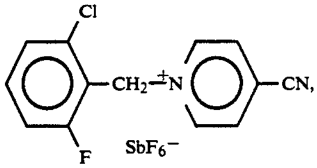
,
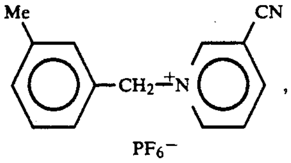
,
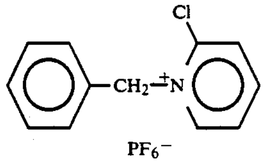
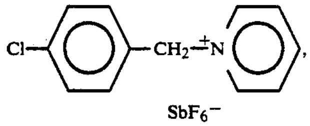
,
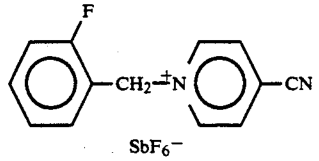
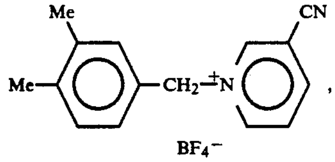
,
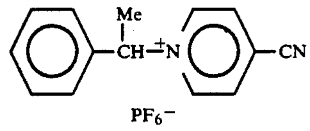
-continued
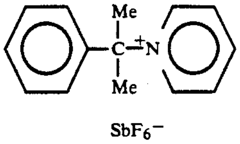
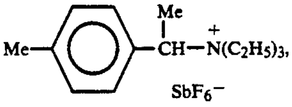
,
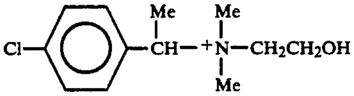
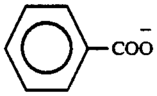
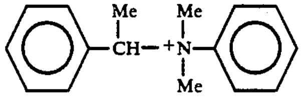
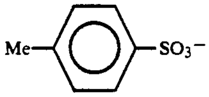
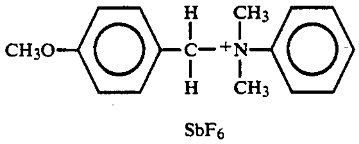
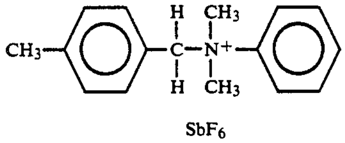
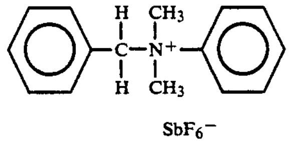
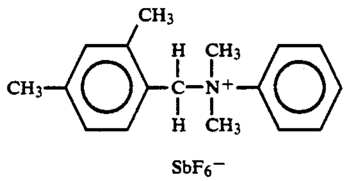
The aromatic ammonium organic acid salts may be produced easily by reacting, e.g., a pyridine group or an amine group with benzylhalide, and then carrying out a salt exchange.
Ammonium organic salts may also be depicted by the following formula:

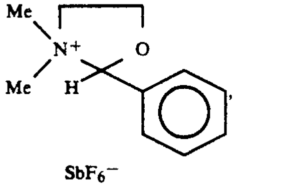

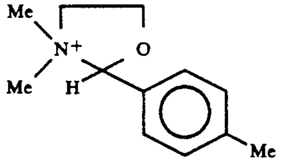

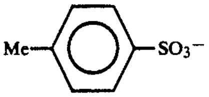

The ammonium organic acid salts represented by the foregoing formulae can be produced by acetalizing an aldehyde or ketone with an alkylamine as follows:

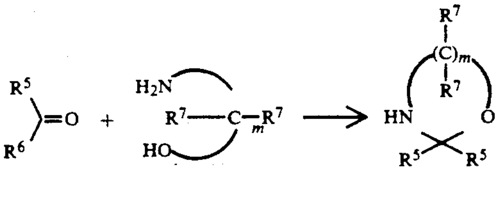

wherein $R^5$, $R^7$ and m are as defined above.

In the next step, the product is reacted with an alkyl halide as follows:

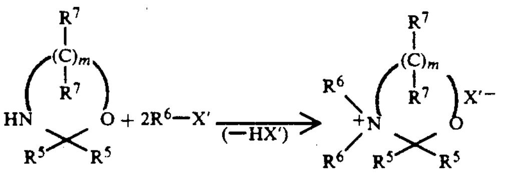

wherein $R^5$, $R^6$, $R^7$ and m are as defined above, and X is a halogen atom.

Lastly, the ammonium organic acid salts are obtained by carrying out a salt exchange.

The heat activating compounds depicted by the previous formulae may be used individually or in combination. When these compounds are heated at temperatures of from about 60° to about 160° C. a carbonium cation is produced, i.e.,:

$$R^1-\phi-\overset{+}{C}H_2,\quad (R^2)_3-\phi-\overset{+}{C}-(R^3)_2,\quad \text{or}\quad \overset{+}{H}$$

thereby enabling the development of color of the electron donating organic compound. However, these compounds are relatively expensive. Moreover, when these compounds are used as the color developer, large quantities are required such as from about 10 to about 50% of the total solid part of the heat sensitive color developing material.

According to a further feature of the invention, when the compounds depicted supra, are combined with a t-butoxyphenyl group, it is rapidly converted to a hydroxyphenyl group and isobutane. The hydroxyphenyl group causes the opening of the lactone ring of the color developing organic compound, thereby enabling effective color development. Accordingly, when the heat activating compound and the compound having the t-butoxyphenyl group are both present, color can be developed economically with a small quantity of heat activator. In addition, by selecting a preferred heat activating compound, it is possible to control the color developing temperature of the heat sensitive color developing material.

The compounds which contain a t-butoxyphenyl group are selected from one or more of the following:

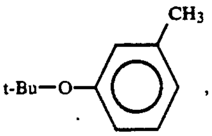 , 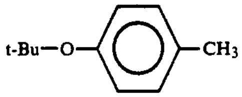

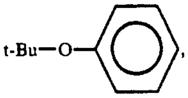 , 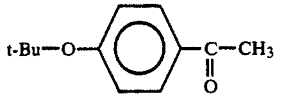

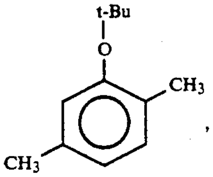 , 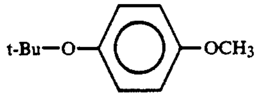

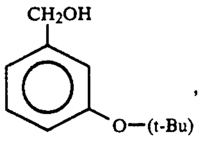 , 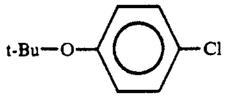

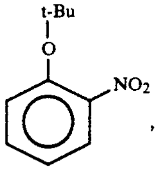 , 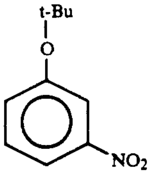

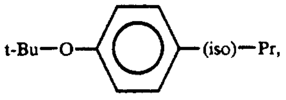

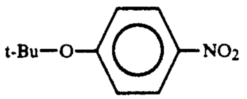

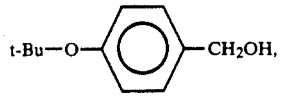 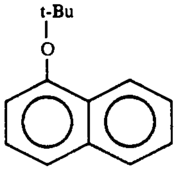

-continued

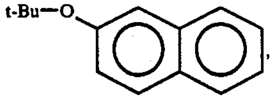

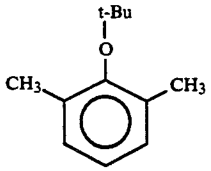

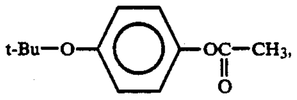

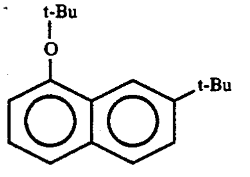

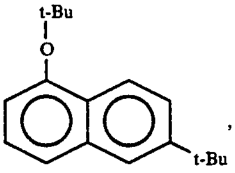

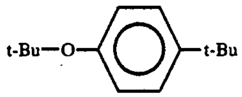

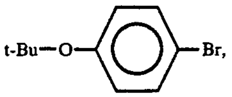

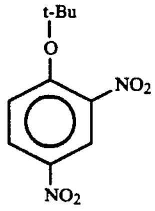

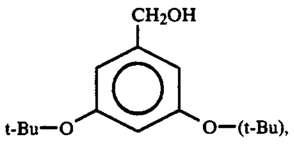

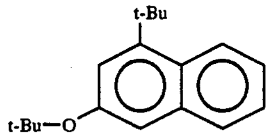

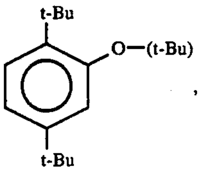

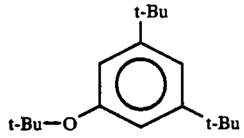

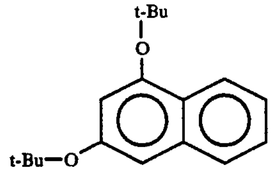

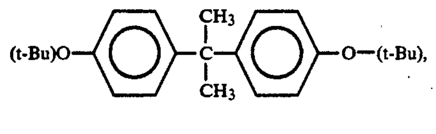

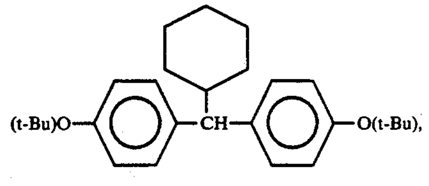

-continued

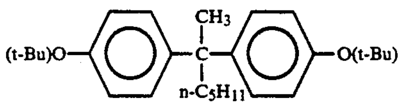

As discussed above, the color developer may be a resin compound having a t-butoxyphenyl group. The average molecular weight of the resin compound is between about 500 to about 50,000. If the molecular weight is less than 500, it becomes sticky, and not capable of forming a film and loses the function of a binder. If the molecular weight is greater than 50,000, the resin compound becomes a high strength film, so that the thermal decomposition of t-butoxyphenyl is delayed and color development is inferior.

A suitable resin is a single polymer having a t-butoxyphenyl group, and copolymers thereof. These include the following, such as p-t-butoxy styrene and 1-t-butoxy-4-arylenebenzene, or the like, said compounds being depicted by the following formulae, respectively:

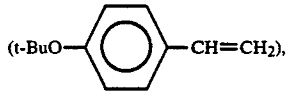

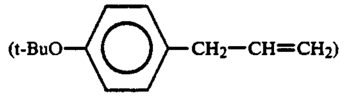

The copolymers are produced from one or more of the following comonomers: an ester of acrylic or methacrylic acid, methyl acrylic acid, ethyl acrylic acid, n-propyl acrylic acid, isobutyl acrylic acid, cyclohexyl acrylic acid, 2-ethylhexyl acrylic acid, octyl acrylic acid, 2-ethyloctyl acrylic acid, dodecyl acrylic acid, benzyl acrylic acid, methyl methacrylic acid, ethyl methacrylic acid, n-propyl methacrylic acid, isopropyl methacrylic acid, n-butyl methacrylic acid, isobutyl methacrylic acid, hexyl methacrylic, cyclohexyl methacrylic acid, 2-ethylhexyl methacrylic acid, octyl methacrylic acid, 2-ethyloctyl methacrylic acid, benzyl methacrylic acid, dodecyl methacrylic acid, phenyl methacrylic acid, 2-hydroxypropyl methacrylic acid, 2-hydroxyethyl methacrylic acid, 2-hydroxypropyl methacrylic acid, or ester of methacrylic or acrylic acid containing a hydroxyl group.

Other ethylene unsaturated monomers which may be used include dialylester fumaric acid, dialylester itacanic acid, styrene, vinyltoluene, α-methylstyrene, acrylonitrile, methacrylonitrile, acrylamide, methacrylamide, vinyloxazoline, vinyl acetic acid, vinyl propionic acid, laurylvinyl ether, a vinyl monomer containing halogen, a vinyl monomer containing silicon, and the like.

A radical polymer initiator may be used as a polymer initiator. These include, for example, azoisobutylnitrile, benzoyl peroxide, t-butylperoxy-2-ethylhexanoate, and the like.

A suitable solvent may also be included.

The polymer initator is generally used in amounts of from about 0.5 to about 10 weight percent based on 100 percent of polymer oriented monomer having t-butoxyphenyl groups, and the copolymer-oriented monomer is about 20 to 80 weight percent.

The resin composition may be prepared by conventional techniques wherein the components are mixed together for a period of from about 3 to about 8 hours at a temperature of from about 20° to about 80° C.

Since the heat sensitive color developing material is used in a film form, a film forming macromolecular substance, i.e., binder may also be included in the formulation. Such a film forming macromolecular substance may be a resin compound containing a t-butoxyphenyl group. In this case, it is not required to use any specific film forming macromolecular substance. Any suitable macromolecular substance not including any acid radical may be used.

In the situation where the heat sensitive coloring developing material is, e.g., a heat sensitive recording paper, the macromolecular substance must satisfy the following requirements in view of the high speed recording.

1. To very finely disperse the heat sensitive dye, color developer, and the like.
2. Attain a good thermal conductivity.
3. Easily generate a thermal reaction of the heat sensitive dye and color developer.
4. Attain a desirable melting point.
5. The ability to dissolve in a conventional solvent or water.

There are available setting-type heat sensitive recording paper or a simultaneously multiple recording paper. The macromolecular substance or binder must also meet these requirements. Accordingly, the following resins containing t-butoxyphenyl groups are preferred: carnauba wax, montane acid wax, polysulfoneether, polycarbonate, polyarylate, polystyrene, carboxymethylcellulose, alginic acid and its derivatives, chlorinated parafin, silicone resin, oxide wax, acrylic resin, and the like.

However, any acid radical that reacts with the leuco compound such as carboxylic, sulfonic, phosphoric acid, and the like may be contained in the binder.

Further, a suitable solvent or wax may be added to the heat sensitive color developing material.

The heat sensitive color developing material contains from 0.1 to about 30, preferably from about 1 to about 10 weight percent based upon 100 weight percent of the heat activator. The color developer is present in amounts of from about 10 to about 70, preferably from about 20 to about 60 weight percent. The film forming macromolecular substance is present in amounts of from about 20 to about 70, preferably from about 30 to about 60 weight percent.

The heat sensitive color developing material may be prepared by conventional methods such as by mixing the components and heating.

The heat sensitive recording paper may be produced by coating from 1 to about 10 $g/m^2$ of the heat sensitive color developing material onto a suitable paper and then drying the same.

EXAMPLES

The following TABLE demonstrates the combination of a color forming organic compound combined with a heat activator and color developer, which are identified below, an acrylic resin which is 30 parts methylmethacrylate and 70 parts n-butylmethacrylate having an average molecular weight of about 7100, and tetrahydrofuran. These were mixed together prior to use. The compositions so produced were coated onto a sheet which was heated to the temperature shown in the TABLE and cooled to room temperature of approximately 25° C. The color changing conditions were then observed. The results are shown in the TABLE. The temperature indicated in the TABLE is in °C., and the color change is indicated as O which means that the color was essentially unchanged and X which means that the color essentially disappeared.

TABLE 1

| | COLOR FORMING ORGANIC COMPOUND (weight part) | HEAT ACTIVATOR (weight part) | COLOR DEVELOPER (weight part) | ACRYLIC RESIN[1)] (weight part) | COLOR CHANGE STARTING temp. (°C.) color before heating → color after heating | COLORING DEGREE[2)] |
|---|---|---|---|---|---|---|
| EMBODIMENT | | | | | | |
| 1 | No. 1 (1.0) | No. 4 (0.2) | No. 12 (10.0) | (5) | colorless —100° C.→ blue | ○ |
| 2 | No. 1 (1.0) | No. 5 (0.2) | No. 13 (10.0) | (5) | colorless —115→ blue | ○ |
| 3 | No. 1 (1.0) | No. 6 (0.2) | No. 14 (10.0) | (5) | colorless —80→ blue | ○ |
| 4 | No. 2 (1.0) | No. 7 (0.2) | No. 15 (10.0) | (5) | colorless —110→ red | ○ |
| 5 | No. 3 (1.0) | No. 8 (0.2) | No. 16 (7.0) + No. 17 (3.0) | (5) | colorless —120→ black | ○ |
| 6 | No. 1 (1.0) | No. 4 (0.2) | No. 18 (10.0) | — | colorless —110→ blue | ○ |
| 7 | No. 1 (1.0) | No. 6 (0.2) | No. 18 (10.0) | — | colorless —85→ blue | ○ |
| 8 | No. 1 (1.0) | No. 7 (0.2) | No. 18 (10.0) | — | colorless —115→ blue | ○ |
| 9 | No. 2 (1.0) | No. 9 (0.2) | No. 19 (10.0) | — | colorless —150→ red | ○ |
| 10 | No. 3 (1.0) | No. 10 (0.2) | No. 19 (10.0) | — | colorless —120→ black | ○ |
| 11 | No. 1 (1.0) | No. 11 (0.2) | No. 19 (10.0) | — | colorless —115→ blue | ○ |
| 12 | No. 2 (1.0) | No. 4 (0.2) | No. 20 (10.0) | — | colorless —110→ red | ○ |
| COMPARISON | | | | | | |

TABLE 1-continued

| | COLOR FORMING ORGANIC COMPOUND (weight part) | HEAT ACTIVATOR (weight part) | COLOR DEVELOPER (weight part) | ACRYLIC RESIN[1] (weight part) | COLOR CHANGE STARTING temp. (°C.) color before heating ⟶ color after heating | COLORING DEGREE[2] |
|---|---|---|---|---|---|---|
| 1 | No. 1 (1.0) | | bisphenol A (10.0) | (5) | when dissolving with a solvent (THF), color was changed to a blue color | — |
| 2 | No. 2 (1.0) | | p-t-butylphenol (10.0) | (5) | when dissolving with a solvent (THF), color was changed to a red color | — |
| 3 | No. 3 (1.0) | | 4-nitrophenol (10.0) | (5) | when dissolving with a solvent (THF), color was changed to a black color | — |
| 4 | No. 1 (1.0) | No. 4 (0.2) | No. 17 (10.0) | (5) | colorless —100→ blue | X |
| 5 | No. 3 (1.0) | No. 4 (0.2) | No. 21 (10.0) | — | colorless —105→ blue [(THF) = tetrahydrofuran] | X |

Remarks =
[1]methylmethacrylate/n-butylmethacrylate = 30/70 copolymer average molecular weight = 7100
[2]the color condition at the heating time was cooled to a room temperature (25° C.). then the coloring condition was evaluated.
∘: Color hardly disappears
X: Color disappears greatly With the formation as shown in the TABLE, the color forming organic compound, heat activating compound, color developer, acrylic resin, and tetrahydrofuran were mixed together. This product was then coated in a solid portion of 2 to 4 g/m$^2$ on a good quality paper, thereby producing a sheet having a color developing composition. Then, by heating the sheet, its color changing conditions were observed. The results are shown in the TABLE. The color changing temperature indicates degrees centigrade, and the color change is indicated with an arrow.

Compounds 1 to 21 listed in the TABLE are as follows: Compound No. 1: 3-(4-diethylaminophenyl)-3-(1-ethyl methylindole-3-ile) phthalide.

Compound No. 1: 3-(4-diethylaminophenyl)-3-(1-ethyl methylindole-3-ile) phthalide.

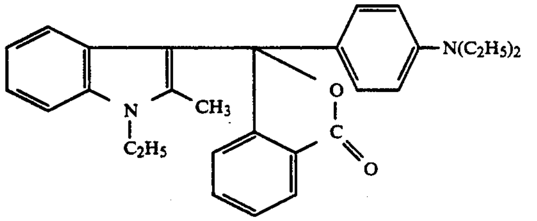

Compound No. 2: 3,3-bis(1-n-butyl-2-methylindole-3-ile) phthalide

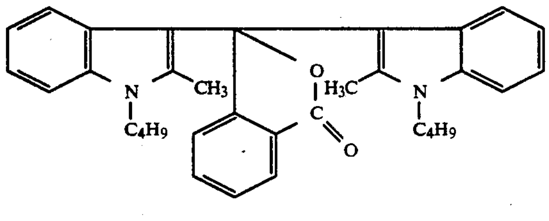

Compound No. 3: 3-dibutylamino-6-methyl-7-anilino fluoran.

-continued

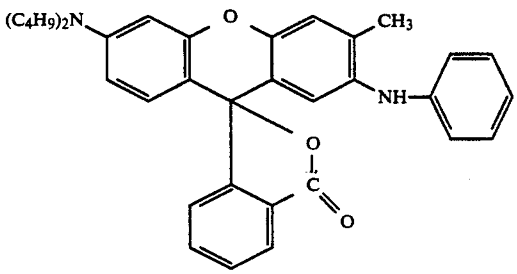

Compound No. 4:

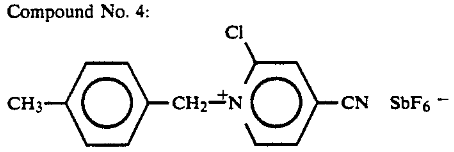

Compound No. 5:

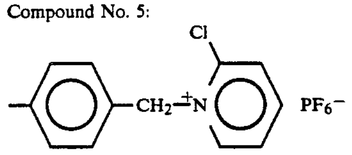

Compound No. 6:

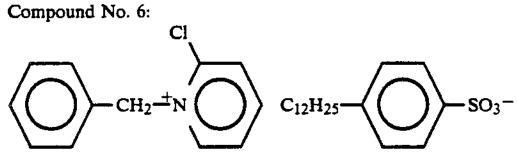

Compound No. 7:

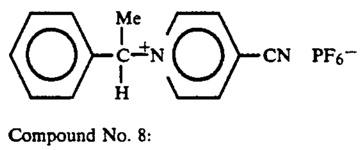

Compound No. 8:

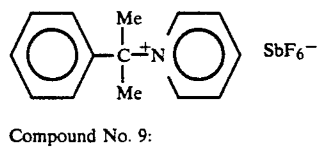

Compound No. 9:

-continued

Compound No. 10:

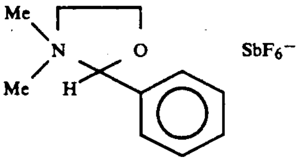

Compound No. 11:

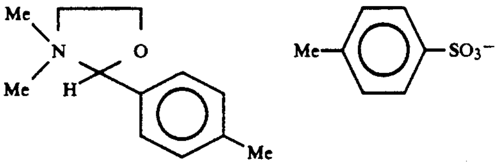

Compound No. 12:

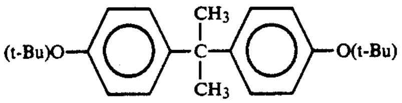

Compound No. 13:

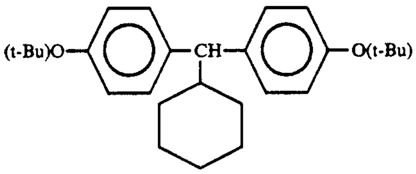

Compound No. 14:

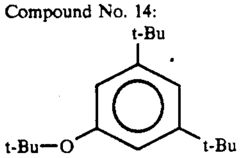

Compound No. 15:

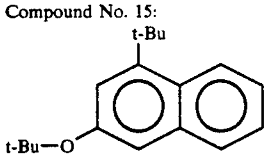

Compound No. 16:

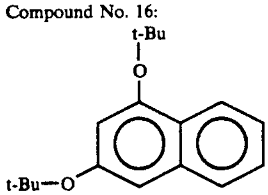

Compound No. 17: di t-butylazipate

Compound No. 18: a radical copolymer having p-t-butoxystyrene/2-ethylhexylacrylate in a 70/30 weight ratio, with an average molecular weight of 8500.

Compound No. 19: a radical copolymer having p-t-butoxystyrene/n-butylacrylate in a 50/50 weight ratio, with an average molecular weight of 7800.

Compound No. 20: a radical copolymer having p-t-butoxystyrene/t-butyl acrylate/2-ethylhexylmethacrylate in a 40/20/40 weight ratio, with an average molecular weight of 9200.

Compound 21: a radical copolymer having t-butylmethacrylate/laurylmethacrylate in a 70/30 weight ratio, with an average molecular weight of 10500.

As discussed previously, according to this invention, the electron-provided color forming organic compound, heat activator and the compound containing t-butoxyphenyl are dispersed in the film forming macromolecular substance, and the product is coated on paper, and the like. Although the foregoing compounds are all dissolved and then mixed with the film forming macromolecular substance, no color is developed, so that it is very easy to coat such product on the paper. Further, the coated paper develops no color unless it is heated. Additionally, it is possible to develop color rapidly even at a relelatively lower heating temperature. Also, it is possible to develop color very effectively with only a small amount of heat activator compound. Since the heat activator is relatively expensive, this results in an economic advantage.

When the resin compound having a t-butoxyphenyl group has a film forming property, it is not required that the aforementioned film-forming substance be used.

Having described preferred embodiments of the invention with reference to the accompanying drawings, it is to be understood that the invention is not limited to the precise embodiments and that various changes and modifications may be affected therein by one skilled in the art without departing from the scope or spirit of the invention which is limited only by the appended claims.

What is claimed is:

1. A heat sensitive color developing material comprising:

(A) an electron donating color forming organic compound;

(B) a heat activating compound selected from the group consisting of compounds I, II, and III,

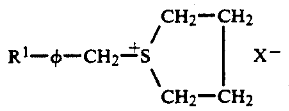

I wherein $R^1$ is selected from the group consisting of H, —R, —OR, a halogen atom, and a nitro group, X is selected from the group consisting of $AsF_6$, $SbF_6$, $BF_4$, $PF_6$, $ClO_4$, $FeCl_4$, $CF_3SO_3$, $RSO_3$, and RCOO—, wherein R is selected from the group consisting of alkyl and cycloalkyl of 1 to 12 carbon atoms substituted by —OH,

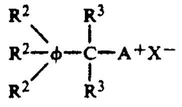

II wherein $R^2$ is independently selected from the group consisting of —COR, —$R^1$, —OH, a cyano radical, and an amino radical, $R^3$ is selected from the group consisting of H, —R, and a halogen atom, A is selected from the group consisting of

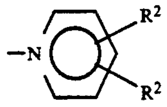 or 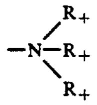

wherein $R^4$ is independently selected from the group consisting of an alkyl, alkenyl of 1 to 12 carbon atoms substituted by a group selected from the group consisting of hydroxy, carboxy, nitro, alkoxy, alkanoyloxy of 1 to 4 carbon atoms, a phenyl group substituted by one or more of a halogen atom, nitro, cyano, amino, —R, and —OR, wherein R, $R^1$ and X are as defined above,

III

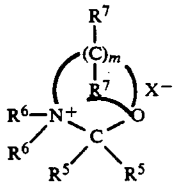

wherein $R^5$ is selected from the group consisting of H, —R, alkenyl of 2 to 3 carbon atoms and $R^8$, $R^6$ is selected from the group consisting of —R, alkenyl of 2 to 3 carbon atoms and $R^8$, $R^7$ is selected from the group consisting of H, hydroxy, —R, —OR, and —$R^8$, wherein —$R^8$ is selected from the group consisting of phenyl and phenyl substituted by a group selected from the group consisting of halogen atom, hydroxy, nitro, cyano, —NHR, —R, and —OR, m is an integer of 1 to 4 and R and X are as defined above, and (C) a color developer selected from the group consisting of compounds IV, V, and a resin compound containing a chain of a t-butoxyphenyl group:

IV

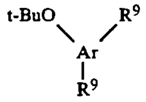

wherein Ar is selected from the group consisting of benzene, naphthalene, and napthalene substituted by a group selected from the group consisting of t-butyl oxide and $R^9$, and $R^9$ is selected from the group consisting of H, —R, —OR, —OCOR, a halogen atom and a nitro group, and R is as defined above;

V

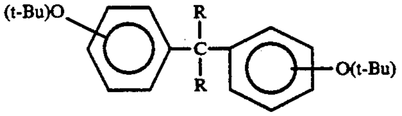

wherein R is as defined above.

2. The heat sensitive color developing material of claim 1, wherein said electron donating color forming organic compound is a leuco dye.

3. The heat sensitive color developing material of claim 1, wherein said resin compound has an average molecular weight of from about 500 to about 50,000.

4. The heat sensitive color developing material of claim 1, containing from 0.1 to about 30 weight percent of said activator compound.

5. The heat sensitive color developing material of claim 1, which further comprises a binder.

6. The heat sensitive color developing material of claim 5, wherein said binder contains a t-butoxyphenyl group.

7. The heat sensitive color developing material of claim 5, which further comprises an acid.

8. The heat sensitive color developing material of claim 7, wherein the acid is selected from the group consisting of carboxylic, sulfonic and phosphoric acids.

9. The heat sensitive color developing material of claim 5, wherein said binder is selected from the group consisting of carnauba wax, montane acid wax, polysulfone ether, polycarbonate, polyarylate, polystyrene, carboxymethylcellulose, alginic acid, derivatives of alginic acid, chlorinated paraffin, silicone resin, oxide wax, and acrylic resin.

* * * * *